United States Patent
Koch et al.

(10) Patent No.: US 9,870,242 B2
(45) Date of Patent: *Jan. 16, 2018

(54) PARALLEL MAPPING OF CLIENT PARTITION MEMORY TO MULTIPLE PHYSICAL ADAPTERS

(71) Applicant: International Business Machines Corporation, Armonk, NY (US)

(72) Inventors: Andrew T. Koch, Rochester, MN (US); Kyle A. Lucke, Oronoco, MN (US); Nicholas J. Rogness, Rochester, MN (US); Steven E. Royer, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/570,878

(22) Filed: Dec. 15, 2014

(65) Prior Publication Data

US 2015/0100718 A1  Apr. 9, 2015

Related U.S. Application Data

(63) Continuation of application No. 13/917,859, filed on Jun. 14, 2013.

(51) Int. Cl.
*G06F 12/10* (2016.01)
*G06F 9/455* (2006.01)
(Continued)

(52) U.S. Cl.
CPC ...... *G06F 9/45545* (2013.01); *G06F 9/45558* (2013.01); *G06F 12/109* (2013.01);
(Continued)

(58) Field of Classification Search
CPC ........ G06F 12/08; G06F 12/10–12/109; G06F 12/023; G06F 12/1027
See application file for complete search history.

(56) References Cited

U.S. PATENT DOCUMENTS 5,228,130 A   7/1993  Michael
5,828,856 A  10/1998  Bowes et al.
(Continued)

FOREIGN PATENT DOCUMENTS

WO    WO 0052588 A1 *  9/2000
WO    WO0052588 A1 *  9/2000 ............. G06F 13/38

OTHER PUBLICATIONS

Andrew T. Koch "Parallel Mapping of Client Partition Memory to Multiple Physical Adapters"; U.S. Appl. No. 13/917,859, filed Jun. 14, 2013.

*Primary Examiner* — Midys Rojas
*Assistant Examiner* — Khoa D Doan
(74) *Attorney, Agent, or Firm* — Patterson + Sheridan, LLP

(57) ABSTRACT

Techniques are disclosed for performing input/output (I/O) requests to two or more physical adapters in parallel. One method for performing an input/output (I/O) request includes mapping an address for at least a first page associated with a virtual I/O request to an entry in a virtual TCE table and identifying a plurality of physical adapters required to service the virtual I/O request. For each of the identified physical adapters, the entry in the virtual TCE table is mapped to an entry in a physical TCE table corresponding to the physical adapter. This method may also include, in parallel, issuing physical I/O requests to the physical adapters.

7 Claims, 6 Drawing Sheets

(51) Int. Cl.
  *G06F 12/1036* (2016.01)
  *G06F 12/109* (2016.01)
  *G06F 12/1081* (2016.01)

(52) U.S. Cl.
  CPC ...... *G06F 12/1036* (2013.01); *G06F 12/1081* (2013.01); *G06F 12/10* (2013.01); *G06F 2009/45579* (2013.01); *G06F 2212/151* (2013.01)

(56) References Cited

U.S. PATENT DOCUMENTS

| | | | |
|---|---|---|---|
| 6,721,812 B1 | 4/2004 | Scott et al. | |
| 6,725,284 B2 * | 4/2004 | Arndt | G06F 9/544 |
| | | | 709/200 |
| 6,793,510 B2 | 9/2004 | Yamakawa et al. | |
| 7,013,379 B1 * | 3/2006 | Testardi | G06F 3/0613 |
| | | | 711/206 |
| 7,308,551 B2 | 12/2007 | Arndt et al. | |
| 7,546,398 B2 | 6/2009 | Corneli et al. | |
| 7,996,628 B2 | 8/2011 | Bauman et al. | |
| 8,024,497 B2 | 9/2011 | Corneli et al. | |
| 8,301,806 B2 | 10/2012 | Brownlow et al. | |
| 2004/0139246 A1 | 7/2004 | Arimilli et al. | |
| 2004/0230714 A1 | 11/2004 | Brice et al. | |
| 2005/0235068 A1 | 10/2005 | Moriki et al. | |
| 2006/0045005 A1 | 3/2006 | Blackmore et al. | |
| 2006/0195848 A1 | 8/2006 | Arndt et al. | |
| 2006/0209863 A1 | 9/2006 | Arndt et al. | |
| 2007/0159960 A1 | 7/2007 | Schimke et al. | |
| 2007/0168643 A1 * | 7/2007 | Hummel et al. | 711/207 |
| 2009/0049235 A1 | 2/2009 | Schreiber et al. | |
| 2009/0119538 A1 * | 5/2009 | Scales | G06F 11/14 |
| | | | 714/6.13 |
| 2009/0307702 A1 * | 12/2009 | Watkins | 718/104 |
| 2010/0106816 A1 * | 4/2010 | Gulati et al. | 709/223 |
| 2010/0223611 A1 | 9/2010 | Mahalingam et al. | |
| 2010/0274876 A1 | 10/2010 | Kagan et al. | |
| 2011/0055515 A1 * | 3/2011 | Khubaib et al. | 711/207 |
| 2011/0314182 A1 | 12/2011 | Muppirala et al. | |
| 2014/0012966 A1 | 1/2014 | Baphna et al. | |
| 2015/0100718 A1 | 4/2015 | Koch et al. | |

* cited by examiner

PARALLEL MAPPING OF CLIENT PARTITION MEMORY TO MULTIPLE PHYSICAL ADAPTERS

CROSS-REFERENCE TO RELATED APPLICATION

This application is a continuation of co-pending U.S. patent application Ser. No. 13/917,859, filed Jun. 14, 2013. The aforementioned related patent application is herein incorporated by reference in its entirety.

BACKGROUND

Field

The present invention relates to improved data processing system, and more specifically, to parallel mapping of client partition memory to multiple physical adapters.

Description of Related Art

Administrators often logically partition the resources of server computers through virtualization. A hypervisor is used to expose virtualized computing hardware to a group of operating systems. For example, the hypervisor may be used to launch virtual computer, each of which provides an operating system (OS) with a set of virtualized computing hardware. In practice, the hypervisor typically launches a server guest operating OS and multiple client guest OSs. A server guest OS acts as a virtual server, and the client guest OSs are virtual computers.

A client guest OS user directly interfaces with virtualized hardware through virtual adapters. A virtual adapter is the virtual analog of a physical device. Common virtualized hardware elements include virtual SCSI controllers and virtual data storage drives (i.e., a virtual disk). In general, a hypervisor accesses data storage units in order to provide storage space to client guest OSs. Oftentimes, a hypervisor accesses multiple physical data storage drives, presented as virtual hard drives to the client guest OSs. One example of such a virtual disk includes logically grouping a set of solid state drives (SSDs) using software-based RAID 1 (i.e., mirroring). A client guest OS can access this virtual disk to store files. Thus, the virtual disk is the virtualized version of the physical solid state drives.

Client guest OSs access server resources using virtual input/output (I/O). Virtual I/O allows a server guest OS to fulfill user commands executed by a client guest OS by translating the virtual I/O associated with the user command to a physical I/O. This physical I/O is then executed on physical hardware (i.e., a physical adapter). For example, a user may save a file to a virtual disk. The client guest OS issues a virtual I/O command to save the file to virtual disk. However, the server guest OS ultimately needs to save the file to a physical disk. To do so, the server guest OS translates the virtual I/O command to a physical I/O command. After completing the physical I/O command, the server guest OS sends a message to the client guest OS to notify the user of a successful save to virtual disk.

To manage large stacks of I/Os from multiple client guest OSs, hypervisors use I/O buffer pages and translation control entry (TCE) tables. The hypervisor translates addresses of I/O buffer pages using TCE tables. The hypervisor uses TCE tables to ensure that the proper I/O buffer pages are targeted during I/O execution. That is, the server guest OS instructs the hypervisor to map an I/O buffer page to an adapter using a TCE entry as a pointer to the I/O buffer page. This is done to execute I/Os referencing the I/O buffer page. After executing the I/O, the server guest OS instructs the hypervisor to unmap the I/O buffer pages. In the case of a single physical adapter, the server guest OS then sends a message to the client guest OS confirming completion of the I/O.

In the case of multiple physical adapters, executing an I/O from a client guest OS requires I/O coordination with the multiple physical adapters. Currently, I/O buffer pages are mapped serially. That is, if a virtual I/O requires physical I/Os on multiple physical adapters, each I/O buffer page associated with one of the physical I/Os must be mapped and unmapped, one after another. Mapping and unmapping I/O buffer pages in this manner can be time-consuming, especially in the case of numerous physical adapters. Continuing with the example above, if a user saves a file to a virtual disk, the client guest OS sends a virtual I/O to the server guest OS. Since there are multiple physical drives, the server guest OS instructs the hypervisor to map the I/O buffer page to the first physical drive, executes the physical I/O on the physical drive, and instructs the hypervisor to unmap the I/O buffer page. Subsequently, the server guest OS instructs the hypervisor to map the I/O buffer page to the second physical drive and repeats this process for each physical drive. Since each mapping and unmapping requires several processor cycles to complete, serial mapping of I/O buffer pages requires a large amount of time.

SUMMARY

One embodiment includes a method for performing an input/output (I/O) request. This method may generally include mapping an address for at least a first page associated with a virtual I/O request to an entry in a virtual TCE table and identifying a plurality of physical adapters required to service the virtual I/O request. For each of the identified physical adapters, the entry in the virtual TCE table is mapped to an entry in the respective physical TCE table corresponding to the physical adapter. This method may also include, in parallel, issuing physical I/O requests to the physical adapters.

In a particular embodiment, the method may further include receiving, from each physical adapter, a response to the physical I/O request and invalidating each mapped entry in the physical TCE tables corresponding to the identified physical adapters.

Other embodiments include, without limitation, a computer-readable medium that includes instructions that enable a processing unit to implement one or more aspects of the disclosed methods as well as a system having a processor, memory, and application programs configured to implement one or more aspects of the disclosed methods.

DETAILED DESCRIPTION

Embodiments presented herein provide techniques for mapping of input/output (I/O) buffer pages to multiple physical adapters in parallel. The techniques allow a memory mapping controller to receive a virtual I/O instruction from a client guest operating system (OS), map the virtual I/O to client guest OS memory, and map physical I/Os corresponding to the virtual I/O to server guest OS memory in parallel. That is, a user accessing a client guest OS can cause the client guest OS to send a virtual I/O to the server guest OS. Executing a virtual I/O ultimately requires the virtual I/O to be translated or converted to physical I/Os. The number of physical I/Os depends on the number of physical adapters required to execute the virtual I/O. In some cases, the server guest OS may determine that multiple physical I/Os must be generated to execute a given virtual I/O. To do so, the server guest OS maps the physical I/Os in parallel, rather than mapping each physical I/O in serial.

Figure 1:
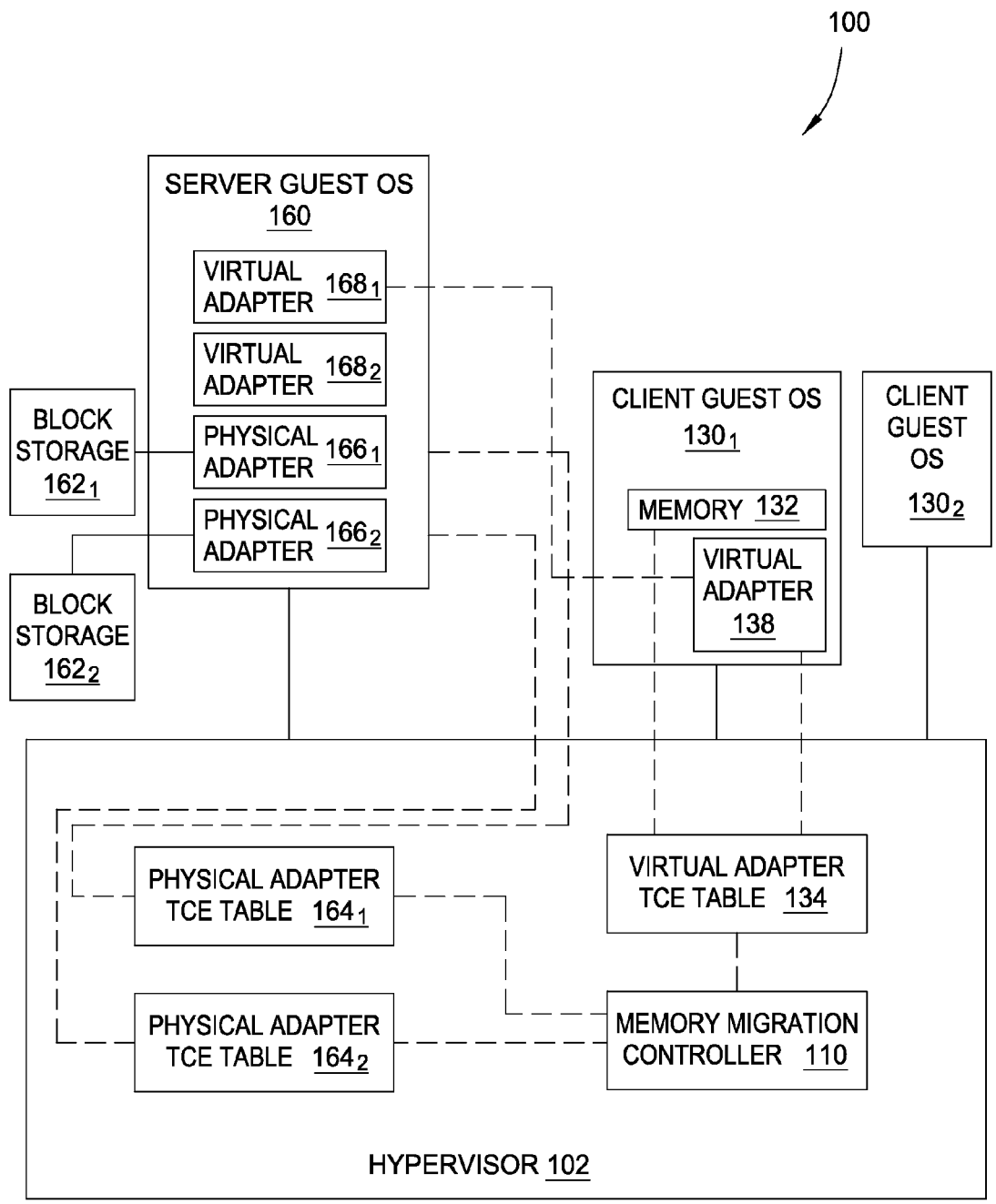
FIG. 1 illustrates a logically partitioned platform including a server partition and a client partition, according to one embodiment.

FIG. 1 illustrates a virtualized server OS 160 and client guest OSs $130_1$ and $130_2$ executing on hypervisor 102, according to one embodiment. Any number of client guest OSs may be instantiated by server guest OS 160, however two are shown for simplicity. Client guest OS $130_1$ includes memory 132 and virtual adapter 138. Server guest OS 160 includes physical adapters $166_1$ and $166_2$, and virtual adapters $168_1$ and $168_2$. Again, while two physical adapters 166 are shown, any number of either may be used as long as there is at least one physical adapter.

Hypervisor 102 manages memory mapping controller 110, virtual adapter translation control entry (TCE) table 134 and physical adapter TCE tables $164_1$ and $164_2$. While two physical adapter TCE tables 164 are shown, any number of physical adapter tables may be used as long as there is at least one physical adapter table per physical adapter 166.

I/O requests sent by guest OS $130_1$ may be executed in the following manner. Client guest OS allocates an I/O buffer page and instructs the hypervisor 102 to store the address of the I/O buffer page in an entry in the virtual TCE table 134. Server guest OS 160 receives an I/O request from client guest OS $130_1$ through virtual adapters 138 and $168_1$. Server guest OS 160 instructs the Hypervisor 102 to map virtual I/O buffer pages associated with virtual I/Os sent by client guest OS $130_1$ into physical adapter tce table $164_1$ and physical adapter tce table $164_2$ in parallel. This mapping process relies on TCE entries from virtual adapter TCE table 134 which reference the virtual I/O buffer pages. Next, server guest OS 160 generates local physical I/Os which are then executed on physical adapters $166_1$ and $166_2$ against block storage devices $162_{1-2}$. For example, physical adapters $166_{1-2}$ may each be a SCSI controller connected to block storage $162_{1-2}$. In such a case, the server guest os may include a software RAID used to mirror data on block storage $162_1$ and $162_2$, via physical adapter $166_1$ and $166_2$, respectively. Once the physical I/Os have been completed by physical adapters $166_1$ and $166_2$, the server guest OS 130 instructs the hypervisor to unmap the I/O buffer page from physical adapter TCE tables $164_1$ and $164_2$.

Figure 2:
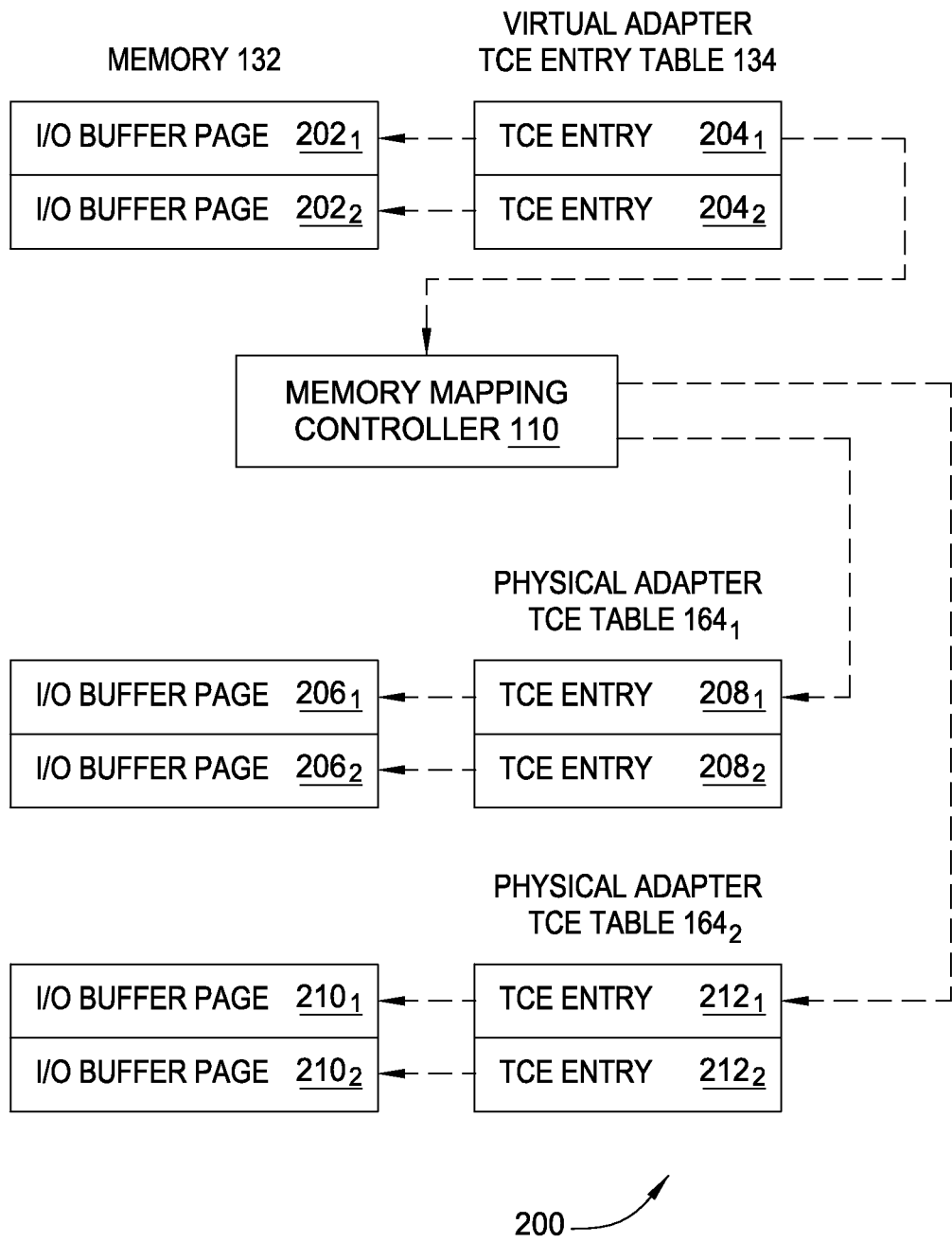
FIG. 2 illustrates a memory mapping controller, according to one embodiment.

FIG. 2 illustrates the parallel mapping process 200 performed by memory mapping controller 110, according to one embodiment. Memory 132 includes I/O buffer pages $202_1$ and $202_2$. In one embodiment, memory 132 includes the physical memory available for allocation by the hypervisor as virtual memory spaces for the guest OSs. I/O buffer pages $202_1$ and $202_2$ contain data referenced by virtual I/O commands from client guest OSs 130.

Virtual adapter TCE table 134 includes TCE entries $204_1$ and $204_2$. Similarly, physical adapter TCE table $164_1$ contains TCE entries $208_1$ and $208_2$. Physical adapter TCE table $164_2$ contains TCE entries $212_1$ and $212_2$. While two TCE entries are shown in each of tables 134, $164_1$ and $164_2$, one TCE entry is used to reference each I/O buffer page $202_1$, $202_2$, $206_1$, $206_2$, $210_1$, and $210_2$ in memory 132. As long as at least one TCE entry exists for each I/O buffer page, any number of TCE entries may be used.

The following describes the process in which memory mapping controller 110 maps I/O buffer pages $202_1$ and $202_2$ from memory 132 to physical adapter TCE table $164_1$ and $164_2$ in parallel. Client guest OS $130_1$ allocates I/O buffer pages $202_1$ and $202_2$ and instructs the hypervisor to map them to TCE entries $204_1$ and $204_2$, respectively. The server guest OS instructs the hypervisor to map the I/O buffer page $202_1$ to TCE entries $208_1$ and $212_1$, by referencing TCE entry $204_1$. Server guest OS 160 then translates the virtual I/O requests into physical I/O requests. Server guest OS 160 produces at least one physical I/O request for each physical adapter. In this case, server guest OS 160 produces two physical I/O requests, one for each physical adapter $166_1$ and $166_2$. Importantly, server guest OS 160 maps the I/O buffer into TCE entries $208_1$ and $212_1$ in parallel.

Figure 3:
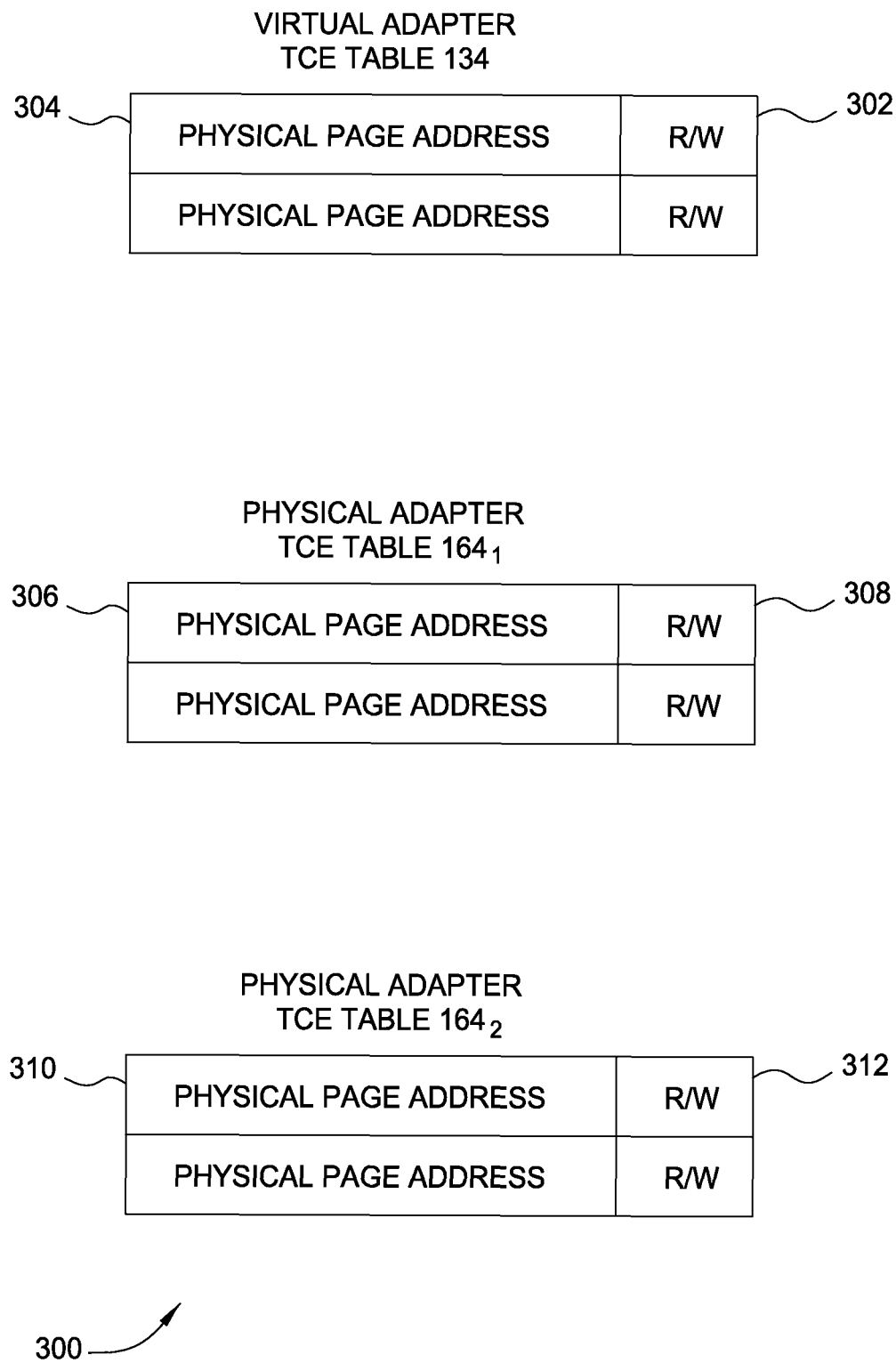
FIG. 3 illustrates example data structures of TCE entry tables, according to one embodiment.

FIG. 3 illustrates an example 300 of data structures of virtual and physical TCE entries. As discussed above, virtual adapter TCE table 134 includes TCE entries, (e.g., TCE entry 2041). TCE entry $204_1$, in turn, includes a physical page address 304 and a read/write access bit 302. Physical page address 304 references the location of an I/O buffer page associated with virtual adapter 138. For example, TCE entry $204_1$ may contain physical page address 304, wherein physical page address 304 points to the first address in memory 132 of I/O buffer page $202_1$. In addition, read/write access bit 302 describes the status of the I/O buffer page referenced by physical page address 304. That is, read/write access bit 302 describes whether the I/O buffer page is currently in active use by memory mapping controller 110 or is inactive (i.e., available for use). When mapping I/O buffer pages, client guest OS $130_1$ may require that a new I/O buffer page be allocated. If so, it instructs the hypervisor to perform the mapping and the memory mapping controller 110 determines whether the specified TCE entry is available. A TCE table contains one available entry if at least one TCE entry has an inactive R/W access bit.

For example, if client guest OS $130_1$ wishes to send a virtual I/O, the client guest OS $130_1$ allocates a new I/O buffer page and instructs the hypervisor to store the physical page address in an entry in TCE table. Memory mapping controller 110 determines whether the TCE entry already has already been mapped. Memory mapping controller 110 makes this determination based on whether the specified TCE in virtual adapter TCE table 134 has an inactive read/write access bit. In this example, memory mapping controller 110 determines that the TCE entry containing read/write access bit 302 is marked "inactive," and thus is available. Finally, memory mapping controller 110 stores the physical page address 304 in the TCE.

Physical adapter TCE tables $164_1$ and $164_2$ contain physical page addresses 306 and 310, respectively. Physical page addresses 306 and 310 are similar to physical page address 304. That is, physical page addresses 306 and 310 reference locations of I/O buffer pages associated with physical adapters $166_1$ and $166_2$. In addition, read/write access bit 308 and 312 are similar to read/write access bit 302. That is, read/write access bit 308 and 312 describe whether the I/O buffer pages referenced by physical page addresses 306 and 310 are active or inactive. The process of allocating memory to physical I/Os is similar to the process of allocating memory to virtual I/Os. That is, Server guest OS 160 allocates I/O buffer pages at physical page address 306. Server guest OS 160 instructs the hypervisor to store physical address 306 in a TCE in physical adapter TCE table $164_1$. For example, memory mapping controller 110 validates the TCE specified by server guest OS 160 based on whether read/write access bit 308 is "inactive" or "active."

Figure 4A:
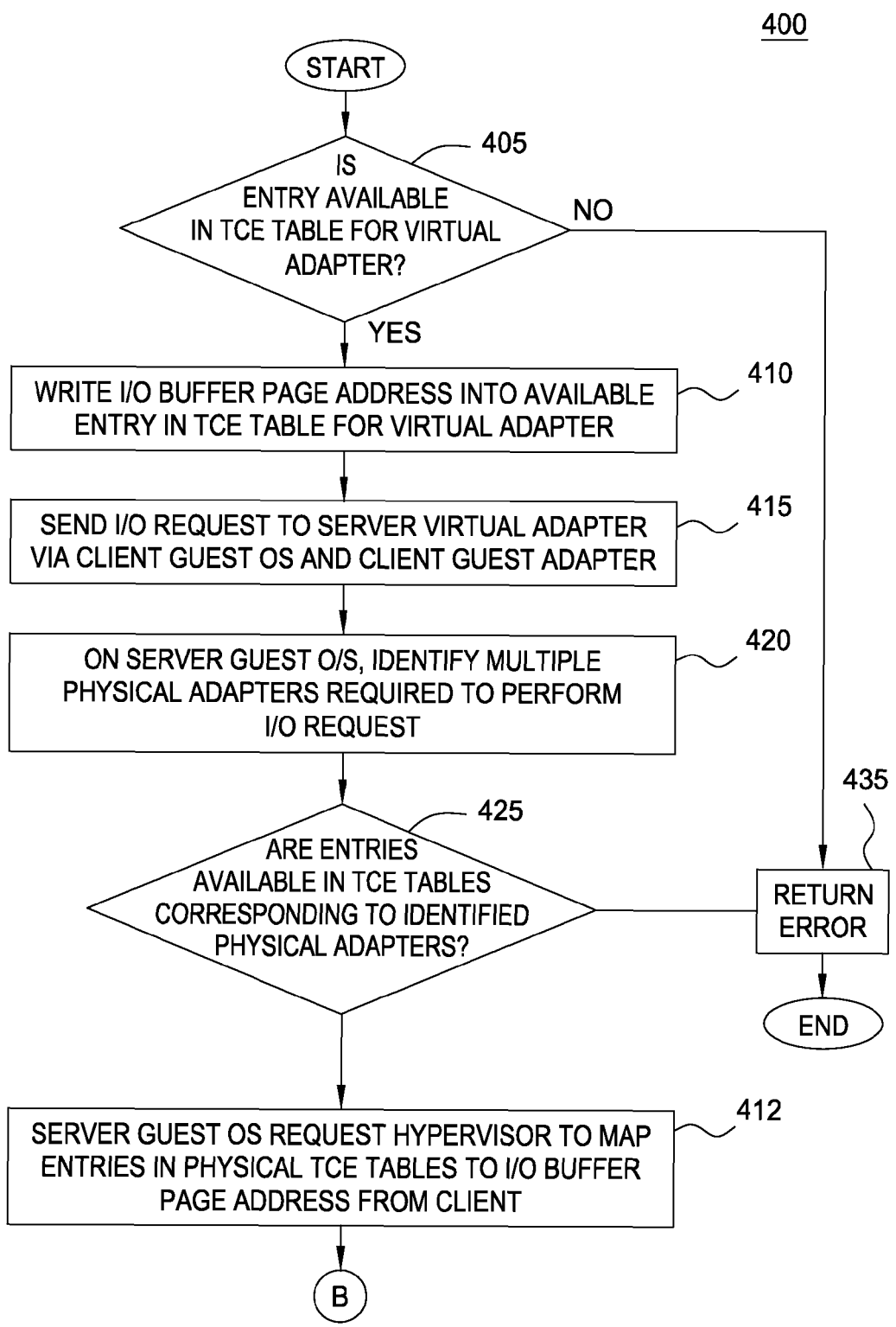
FIGS. 4A and 4B are flowcharts illustrating a method performing an I/O request, according to one embodiment.
Figure 4B:
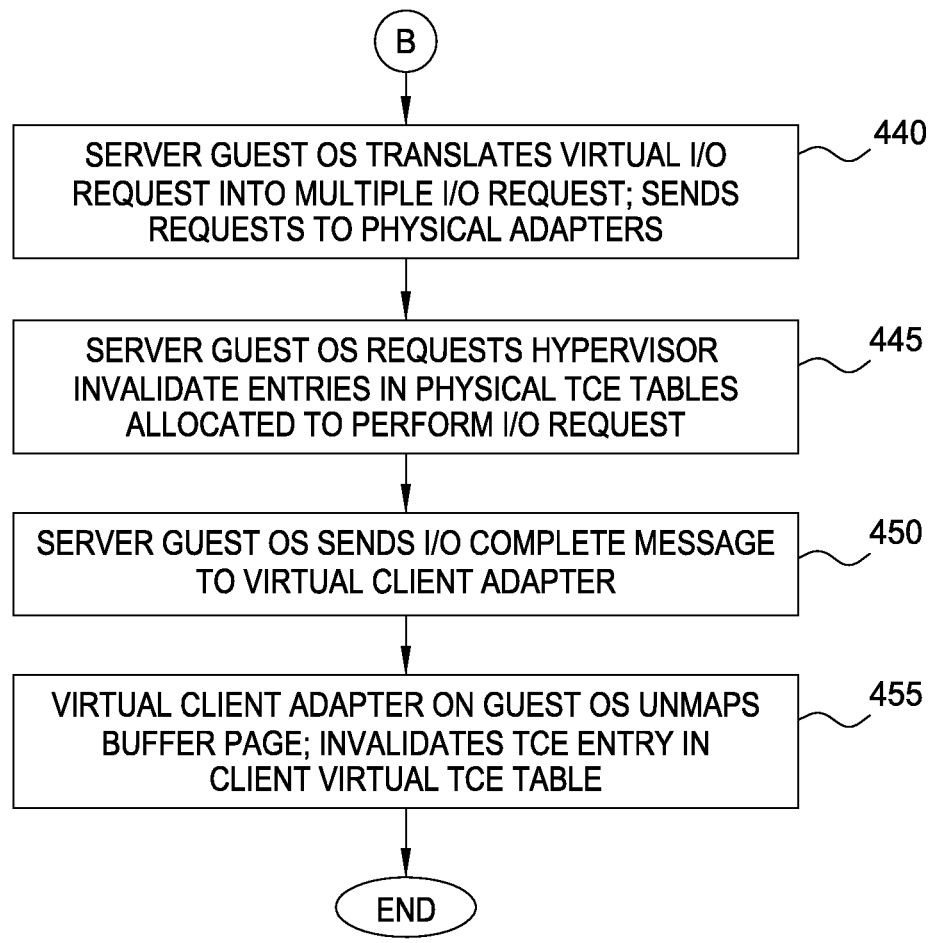

FIGS. 4A and 4B illustrate a method 400 performing an I/O request, according to one embodiment. A client guest OS, via a client virtual adapter, may perform elements of method 400 to perform an I/O operation in conjunction with a virtual adapter owned by a server operating system and multiple physical adapters. For example, the client guest OS may request e.g., to perform a read or write request to a block storage device or file system, where the I/O request is ultimately performed by multiple physical adapters in parallel. Prior to issuing an I/O request, the client virtual adapter creates entries in the TCE table used to perform the I/O request, as described below.

As shown, the method 400 begins at step 405 where a virtual adapter on a client guest OS determines whether a TCE entry is available in a TCE table associated with the client virtual adapter. If not, then an error has occurred and the method 400 terminates at 435. For example, if the TCE table may be of a fixed size or have a maximum number of entries, e.g., based on the by the type of virtual adapter, e.g., a virtual SCSI adapter versus a virtual SAN adapter. Otherwise, assuming an entry is available in the TCE table, at step 410 the client virtual adapter writes an I/O buffer page address into an entry in the TCE table associated with by the client virtual adapter.

At step 415, the client guest OS initiates an I/O request to read from (or write to) a storage device. To do so, the client guest OS causes a client virtual adapter to send an I/O request to a corresponding virtual adapter on a server guest OS. Once received, at step 420, the virtual adapter on the server guest OS identifies a plurality of physical adapters required to fulfill the request. For example, assume the I/O request is to perform a write operation against a mirrored RAID array of physical block storage devices. In such a case, an I/O write request needs to be performed by at least two physical adapters, e.g., two SCSI adapters managed using a software based RAID array.

At step 425, the virtual adapter on the server guest OS determines whether entries are available in TCE tables corresponding to the identified physical adapters. If not, at step 435, the I/O operation is aborted and an error is returned to the requesting client guest OS (via the client virtual adapter on that guest OS). Assuming entries are available, then at step 412, the server guest OS invokes one or more hypervisor calls to map entries in a physical TCE table corresponding to each physical adapter identified at step 420 to the I/O buffer page written to the virtual adapter TCE table associated with the client guest OS virtual adapter.

Turning to FIG. 4B, at step 440, the server guest OS (via the virtual adapter on the server guest OS) translates the virtual I/O request into multiple physical I/O requests, one for each physical I/O adapter identified at step 420. Because the TCE table for each physical adapter includes an entry mapping to the buffer page address of the client adapter, the physical I/O requests may be performed in parallel. The results of the I/O requests, e.g., a confirmation of a successful write or data associated with a successful read are provided to the server guest OS virtual client adapter. Thereafter, at step 445, the server guest OS invokes hypervisor calls to invalidate the TCE table entries allocated at step 412. That is, once the I/O operation is complete, entries in the TCE tables of the physical adapters are made available for other I/O operations.

At step 450, the server guest OS sends an I/O complete message to the virtual client adapter on the client guest OS. For example, the virtual adapter on the server guest O/S returns a message that a write operation has been written to the buffer page mapped by the client virtual adapter at step 410. After retrieving the buffered data, at step 455, the virtual client adapter on the guest OS unmaps the buffer page address. That is, the virtual client adapter sends a message to the hypervisor to invalidate the entry in the TCE table used to perform the I/O operation.

Figure 5:
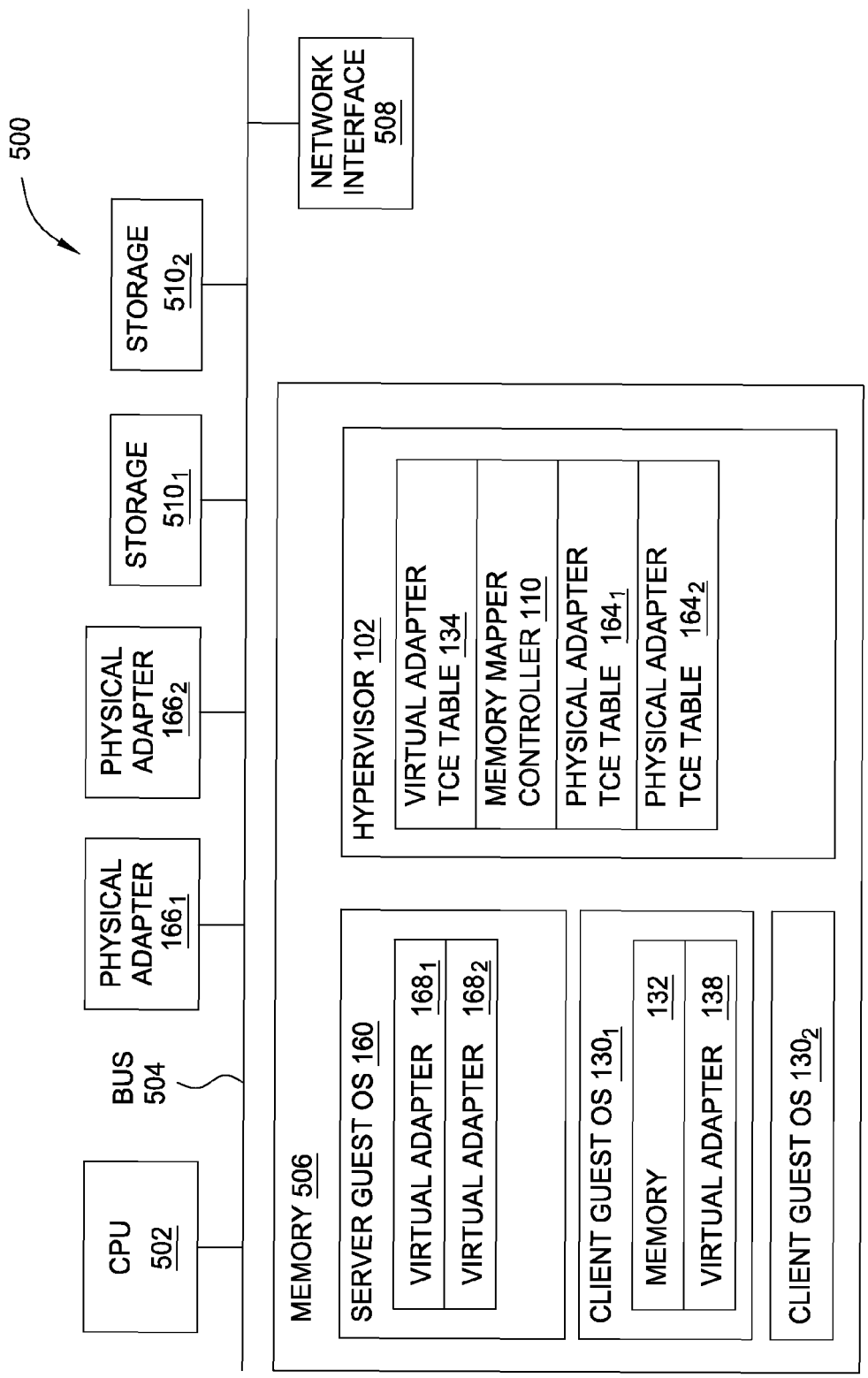
FIG. 5 illustrates an example computing infrastructure of a server computer, according to one embodiment.

FIG. 5 illustrates an example computing system 500 configured to map virtual I/O buffer pages to physical I/O buffer pages in parallel. As shown, the computing system 500 includes, without limitation, a central processing unit (CPU) 502, a bus 504, memory 506, a network interface 508, storage units $510_1$ and $510_2$ and physical adapters $166_1$ and $166_2$. Note, CPU 502 is included to be representative of a single CPU, multiple CPU, a single CPU having multiple cores, and the like. Furthermore, memory 506 is generally included to be representative of a random access memory (RAM). Storage $510_1$ and $510_2$ may be disk drive storage devices or solid state storage devices. Computing system 500 may include any number of storage devices, however, only two are shown for simplicity. Furthermore, although each storage unit $510_1$ and $510_2$ are shown as single units, each storage unit may be a combination of fixed and/or removable storage devices, such as fixed disc drives, removable memory cards, or optical storage, network attached storage (NAS), or a storage area network (SAN). In one embodiment, physical adapters $166_1$ and $166_2$ are linked to storage $510_1$ and $510_2$.

Illustratively, memory 506 includes server guest OS 160, client guest OSs $130_1$ and $130_2$ and hypervisor 102. Server guest OS 160 virtual adapters $168_1$ and $168_2$. Client guest OS $130_1$ includes memory 132 and virtual adapter 138. Computing system 500 can support additional client guest OSs, however only client guest OS $130_1$ and $130_2$ are shown for simplicity. Hypervisor 102 includes memory mapping controller 110, virtual adapter TCE table 134 and physical adapter TCE tables $164_1$ and $164_2$.

Memory mapping controller 110 achieves this by allocating TCE entries mapping an I/O buffer pages for virtual adapters and mapping entries in virtual adapter TCE table 134 to physical adapter TCE tables $164_{1-2}$ (on request from the server guest OS). By creating mappings from the virtual adapter table to multiple physical adapters $164_{1-2}$, I/O requests may be performed in parallel. That is, memory mapping controller 110 maps and unmaps I/O buffer pages in parallel. Once the I/O operation is complete, the memory mapping controller 110 invalidates the TCE entries in tables 134, $164_{1-2}$ allocated to perform a given I/O operation. Through parallel page mapping, memory mapping controller 110 achieves a performance gain over serial page mapping techniques.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may perform operations on a client guest OS that are directed to a server guest OS, wherein both client and server guest OSs are based on a server computer in the cloud. For example, a client guest OS could send virtual I/Os to a server guest OS which are then mapped and translated on a computing system in the cloud. The server guest OS can perform mapping and translating in parallel. Mapping and translating in parallel allows the virtual I/Os to be performed more efficiently than doing so in series.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method for performing an input/output (I/O) request, the method comprising:
    mapping an address for at least a first page associated with a virtual I/O request to an entry in a virtual translation control entry (TCE) table;
    identifying a plurality of physical adapters required to service the virtual I/O request;
    upon determining, in at least one of the identified physical adapters, that an entry in a respective physical TCE table corresponding to the physical adapter is unavailable:
        aborting the virtual I/O request, and
        returning an error; and
    upon determining, in each of the identified physical adapters, that an entry in the respective physical TCE table corresponding to the physical adapter is available, for each of the identified physical adapters:
        in parallel, mapping the entry in the virtual TCE table to an entry in the respective physical TCE table corresponding to the physical adapter, and
        in parallel, issuing a physical I/O request corresponding to each physical TCE table entry to the respective physical adapter.

2. The method of claim 1, further comprising:
    receiving, from each physical adapter, a response to the physical I/O request; and
    invalidating each mapped entry in the physical TCE tables corresponding to the identified physical adapters.

3. The method of claim 2, further comprising:
    invalidating the mapped address for the first page in the virtual TCE table.

4. The method of claim 1, wherein each the physical adapters performs the I/O request using the mapped entries in the corresponding physical TCE table.

5. The method of claim 1, wherein a virtual adapter on a client guest OS maps the address for at least the first page associated with the virtual I/O request to the entry in the virtual TCE table.

6. The method of claim 1, wherein a virtual adapter on a server guest O/S identifies the plurality of physical adapters required to service the virtual I/O request.

7. The method of claim 1, wherein the I/O request is a request to read to or write from a block storage device.

* * * * *